United States Patent [19]

White

[11] 4,156,764
[45] May 29, 1979

[54] POLY(HYDROXY) TELECHELIC STYRENE POLYMER PROCESS

[75] Inventor: Dwain M. White, Schenectady, N.Y.

[73] Assignee: General Electric Company, Schenectady, N.Y.

[21] Appl. No.: 907,596

[22] Filed: May 19, 1978

[51] Int. Cl.$^2$ .............................. C08F 2/38; C08F 4/32; C08F 12/08; C08F 12/16
[52] U.S. Cl. .................................. 526/211; 526/218; 526/222; 526/227; 526/229; 526/230; 526/293; 526/346
[58] Field of Search ................................ 526/MS File

[56] References Cited

U.S. PATENT DOCUMENTS

| | | | |
|---|---|---|---|
| 2,396,997 | 3/1946 | Fryling | 526/346 |
| 3,381,059 | 4/1968 | Harris | 526/346 |
| 3,385,912 | 5/1968 | Harris | 526/346 |
| 3,407,246 | 10/1968 | Harris | 526/346 |
| 3,960,824 | 6/1976 | Hicks | 526/346 |
| 4,064,337 | 12/1977 | Uraneck et al. | 526/346 |

*Primary Examiner*—John Kight, III
*Attorney, Agent, or Firm*—F. Wesley Turner; Joseph T. Cohen; Charles T. Watts

[57] ABSTRACT

A poly(hydroxy) telechelic styrene polymer polymerization process comprising contacting an olefin, a free radical polymerization initiator, and a poly(hydroxyorgano) polysulfide is described. The poly(hydroxy) terminated styrene polymers can be end-capped and/or coupled with other polymeric materials. The styrene polymers can be molded, calendered, or extruded as films, sheets, fibers, laminates or other useful articles of manufacture.

6 Claims, No Drawings

POLY(HYDROXY) TELECHELIC STYRENE POLYMER PROCESS

CROSS REFERENCE TO RELATED APPLICATIONS

This invention is related to subject matter disclosed in my copending U.S. application Ser. Nos. 907,588 and 916,762 filed on May 19, 1978 and June 19, 1978, respectively. All of the aforesaid applications are assigned to the assignee of this application and all of the subject matter disclosed and referenced therein is incorporated herein in its entirety by reference.

BACKGROUND OF THE INVENTION

1. Field of the Invention

This invention relates to a poly(hydroxyorgano) telechelic styrene polymerization process which comprises contacting an olefin, a free radical polymerization initiator and a poly(hydroxyorgano) polysulfide. The poly(hydroxyorgano) terminated styrene polymers can be end-capped and/or coupled with other polymeric materials. The styrene polymers can be molded, calendered, or extruded into films, sheets, fibers, laminates or other useful articles of manufacture.

2. Description of the Prior Art

The polymerization of styrene either alone or in the presence of other copolymerizable monomers is well-known. In general the polymerization of styrene is described in terms of various reaction mechanisms including free radical initiation, propagation, chain transfer and termination reaction mechanisms.

Heretofore, to the best of my knowledge, the polymerization of styrene to form homopolymers or copolymers with other copolymerizable monomers has not been carried out in the presence of poly(hydroxyorgano) polysulfide reactants which perform two functions, i.e. (I) act as effective chain transfer agents and (II) form reactive hydroxyorgano polystyrene end groups.

Although various radical polymerization and sulfur chemistry texts generally state that (a) "some organic disulfides via homolytic dissociation function as polymerization initiators", (b) "some mono- and disulfides, e.g. RSR and RSSR compounds dissociate to radicals either photochemically or thermally at moderate temperatures, and have been used as initiators of polymerization 'and', in some cases, complications arise from transfer to initiator which may be accompanied by retardation", and (c) "that mercaptans as well as aryldisulfides act as chain transfer agents during the polymerization of styrene,"

I believe in view of the absence of known scientific evidence describing the reactions of poly(hydroxyorgano) polysulfides in the polymerization of styrene polymers under free radical polymerization reaction conditions that my observation that poly(hydroxyorgano) polysulfides are effective chain transfer agents and also provide polyfunctional reactive end groups for styrene polymers is unobvious.

DESCRIPTION OF THE INVENTION

This invention embodies a poly(hydroxyorgano) telechelic styrene polymerization process comprising contacting an olefin, a free radical polymerization initiator, and a poly(hydroxyorgano) polysulfide. The poly(hydroxyorgano) terminated styrene polymers can be end-capped and/or coupled with other polymeric materials. The styrene polymers can be molded, calendered, or extruded as films, sheets, fibers, laminates or other useful articles of manufacture.

The expression "olefin" as employed herein and in the claims includes any free radical polymerizable olefin. Illustratively olefins include styrene; o-, m- and p-methylstyrene; 2,4-dimethylstyrene; 2,5-dimethylstyrene; 3,4-dimethylstyrene; 3,5-dimethylstyrene; p-ethylstyrene; p-isopropylstyrene; p-cyclohexylstyrene; o-, m- and/or p-fluorostyrene; 2-methyl-4-fluorostyrene; m- and p-chlorostyrene; p-bromostyrene; 1-vinylnaphthalene; 2-vinylnaphthalene; 1-vinyl-4-chloronaphthalene; 6-vinyl-1,2-3,4-tetrahydronaphthalene; 4-vinylbiphenyl and 9-vinylphenanthrene, etc. Olefin monomers are commonly referred to as "vinyl aromatic monomeric reactants" and said monomers can be copolymerized with other well-known olefinic materials in the preparation of various copolymers including — however not limited to — styrene-acrylonitrile; styrene-butadiene-acrylonitrile; styrene-butadiene; styrene-divinyl benzene; styrene-maleic anhydride; styrene-vinyl acetate; styrene-isoprene, etc., copolymers.

In a presently preferred embodiment the "vinyl aromatic monomers" employed in the formation of homo- or co-polymers of styrene are of the formula:

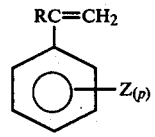

wherein independently R is hydrogen, lower alkyl or halogen, Z is a member selected from the class consisting of vinyl, hydrogen, chlorine and lower alkyl, and p is a whole number equal to from 0 to 5.

The expression "free radical polymerization initiator" as employed herein and in the claims includes any free radical polymerization initiator. Illustratively free radical polymerization initiators include peroxides, persulfates, hydroperoxides, peresters, azo compounds, photoinitiators, etc. Those skilled in the art know that the type of free radical initiator employed can vary depending upon the particular type of polymer or copolymer being prepared since certain free radicals species are more effective in polymerization of certain olefins, e.g. styrene, than others which are more effective in copolymerizing styrene with other monomer types, e.g. methylmethacrylate. Accordingly, selection of the appropriate free radical initiators will be apparent or can be readily determined by routine experimentation by those having ordinary skill in the art. By way of illustration, generally useful free radical polymerization initiators include the following: methyl peroxide; ethyl peroxide; propyl peroxide; isopropyl peroxide; tert-butyl peroxide; 1-hydroxybutyl-n-butyl peroxide; tert-amyl peroxide; tert-butyl-α-cumyl peroxide; 2,5-dimethyl-2,5-di(tert-butylperoxy)hexane; n-butyl-4,4-bis(tert-butylperoxy)valerate; cumyl peroxide; acetyl peroxide; propionyl peroxide; butyryl peroxide; succinoyl peroxide; benzoyl peroxide; 4-bromobenzoyl peroxide; 3,5-dibromo-4-methoxybenzoyl peroxide; phenylacetyl peroxide; 5-phenylvaleryl peroxide; lauroyl peroxide; myristoyl peroxide; tert-butyl hydroperoxide; cumene hydroperoxide; tetralin hydroperoxide; tert-butyl peracetate; ethyl tert-butyl peroxalate; di(tert-butylperoxy)-oxalate; tert-butyl perbenzoate; tert-butyl-N-(3-chlorophenylperoxy) carbamate; tert-butyl 2-methylsulfonylperbenzoate; tert-butyl 4-(methylthio)-perbenzoate; tert-butyl phenylperacetate, tert-butyl 4-tert-butylperbenzoate; 2,2'-azo-bis-isobutyronitrile; 1,1'-azo-bis-1-cyclobutanenitrile; 4,4'-azo-bis-4-cyanopentanoic acid; 2,2'-azo-bis-2,4-dimethylvaleronitrile; 1,1'-azo-bis-1-cycloheptane nitrile; 2,2'-azo-bis-2-cyclohexylpropionitrile; 1,1'-azo-bis-1-cyclodecane nitrile; 2,2'-azo-bis-propane; triazobenzene; azo-bis-isobutyramidine; 1,1'-azo-bis-1-phenylethane; 1,1'-azo-bis-1-phenylpropane; phenyl-azo-triphenylmethane; azo-bis-diphenylmethane; and 4-acetaminophenyl-azo-triphenylmethane.

The expression "poly(hydroxyorgano) polysulfide" as employed herein and in the claims includes illustratively any polysulfide of the formula:

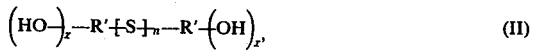 (II)

wherein independently each x is an integer at least equal to 1, n is an integer at least equal to 2, R' is at least a divalent arene radical having at least one hydroxyl (—OH) radical directly bonded to an aromatic ring carbon atom via the oxygen atom of the hydroxyl group.

In a presently preferred embodiment, R' contains 6—30 carbon atoms. In a still more preferred embodiment, R' is a $C_{6-10}$ aryl or aralkyl radical, x is equal to 1, and n is equal to 2.

Illustratively preferred polysulfides include bis(4-hydroxyphenyl)disulfide, bis(4-hydroxyphenylmethylene)-disulfide, bis(4-hydroxyphenylethylene)disulfide, and bis(4-hydroxynaphthylene)disulfide, etc.

The polymerization process can be carried out employing any conventional polymerization technique for producing styrene homo- and copolymers, e.g. bulk polymerization, solution polymerization, suspension polymerization, emulsion polymerization, continuous bulk/solution polymerization, etc. Polymerization reaction temperatures can be any reaction temperatures in which the polymerization reaction takes place, e.g. 0° C. or less to 150° C. or more, and preferably from 25° C. to about 100° C. Broadly, the reaction time varies with quantity of reactant as well as the life of the free radical initiator employed, however basicaly the reaction time can be any time, e.g. from about 1/10 hr. or less to 10 hours or more. Those skilled in the art can readily determine the appropriate reaction time and temperatures through routine experimentation.

The following examples illustrate the best mode of the invention.

EXAMPLE I — Preparation of Bis(4-hydroxyphenyl)disulfide

A solution of 4-mercaptophenol (200 g., 1.6 m.) in 300 ml. 60% aqueous ethanol was brought to pH 7 by the addition of sodium bicarbonate. A solution of iodine (200 g., 0.8 m.) and potassium iodide (50 g.) in 300 ml. water was added until a yellow end point was reached. The product was filtered off, washed with water and dried. Yield: 97.5%, mp. 144°-6° (lit. 148°-50°). The $^1H$ nmr was consistent with the disulfide structure of the formula:

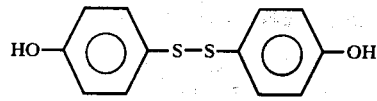

EXAMPLE II — Preparation of Poly(hydroxyorgano) Telechelic Styrene Polymer

Styrene (100 gms., 0.96 mole, freshly distilled), azobisisobutyronitrile (0.05 gms.) and bis(4-hydroxyphenyl)-disulfide (3.71 gms., 0.0148 mole) in a 4 oz. screw-cap bottle under nitrogen was heated at 50±3°. A stirring bar was used to agitate the mixture since the disulfide was not completely soluble in the styrene. After 4 days the viscous liquid was dissolved in toluene and the polymer was precipitated by dropwise addition to methanol. The polymer was filtered off, dried, then redissolved in toluene and washed with 12% aqueous sodium hydroxide, dilute acetic acid and three times with water. The solution was added dropwise to toluene and the polymer again was re-precipitated from toluene by methanol. After drying the product weighed 23.4 g. Intrinsic viscosity in chloroform at 25°: 0.52 dl./g. Infrared: 3594 cm.$^{-1}$ (absorbance for 500 mg./10 ml. $CS_2$ was 0.176). The product structure is of the formula:

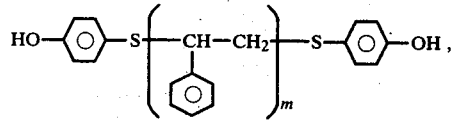

m being a number average within the range of from about 600 to 800.

The poly(hydroxyorgano) telechelic styrene polymers prepared in accordance with the process of this invention — being bifunctional — can be advantageously combined with the novel bifunctional quinone-coupled oxides polyphenylene oxides described in my copending U.S. patent application Ser. No. 800,635, filed May 26, 1977, as well as other well-known monofunctional polyphenylene oxides of the prior art. Because of the reactive bifunctional character of the novel polystyrene polymers prepared by the process of this invention, (novel polystyrene-polyphenylene oxide block polymers claimed in my copending U.S. patent applications Ser. Nos. 916,762; 916,763 and 916,761, all filed on June 19, 1978,) can be prepared which are useful in a wide variety of articles of manufacture.

I claim:

1. A poly(hydroxyorgano)telechelic styrene polymer polymerization process comprising contacting an olefin, a free radical polymerization initiator, and a poly(hydroxyorgano) polysulfide.

2. The claim 1 process wherein the olefin is a vinyl aromatic monomeric reactant, the initiator is selected from peroxides persulfates, hydroperoxides, peresters, azo compounds or photoinitiators, and the polysulfide is of the formula

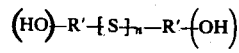

wherein independently each x is an integer at least equal to 1, n is an integer at least equal to 2, R' is at least a divalent arene radical having at least one hydroxyl (—OH) radical directly bonded to an aromatic ring carbon atom via the oxygen atom of the hydroxyl group.

3. The claim 2 process wherein the vinyl monomer is of the formula

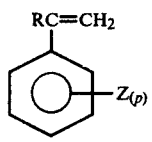

wherein independently R is hydrogen, lower alkyl or halogen, Z is a member selected from the class consisting of vinyl, hydrogen, chlorine and lower alkyl, and p is a whole number equal to from 0 to 5.

4. The claim 2 process wherein R' is a $C_{6-10}$ aryl or arylalkyl radical, x is equal to 1 and n is equal to 2.

5. The claim 4 process wherein the free radical polymerization initiator is an azo compound.

6. The claim 5 process wherein the vinyl monomer is styrene, the polysulfide is bis(4-hydroxyphenyl) disulfide and the azo compound is 2,2'-azo-bis-isobutylnitrile.

* * * * *